Dec. 8, 1931.   R. B. MILLER   1,835,318
VARIABLE SPEED POWER TRANSMITTING MECHANISM
Filed Nov. 29, 1929   2 Sheets-Sheet 1

INVENTOR.
Rollin B. Miller
BY
Stuart C Barnes
ATTORNEY.

Dec. 8, 1931.  R. B. MILLER  1,835,318
VARIABLE SPEED POWER TRANSMITTING MECHANISM
Filed Nov. 29, 1929  2 Sheets-Sheet 2
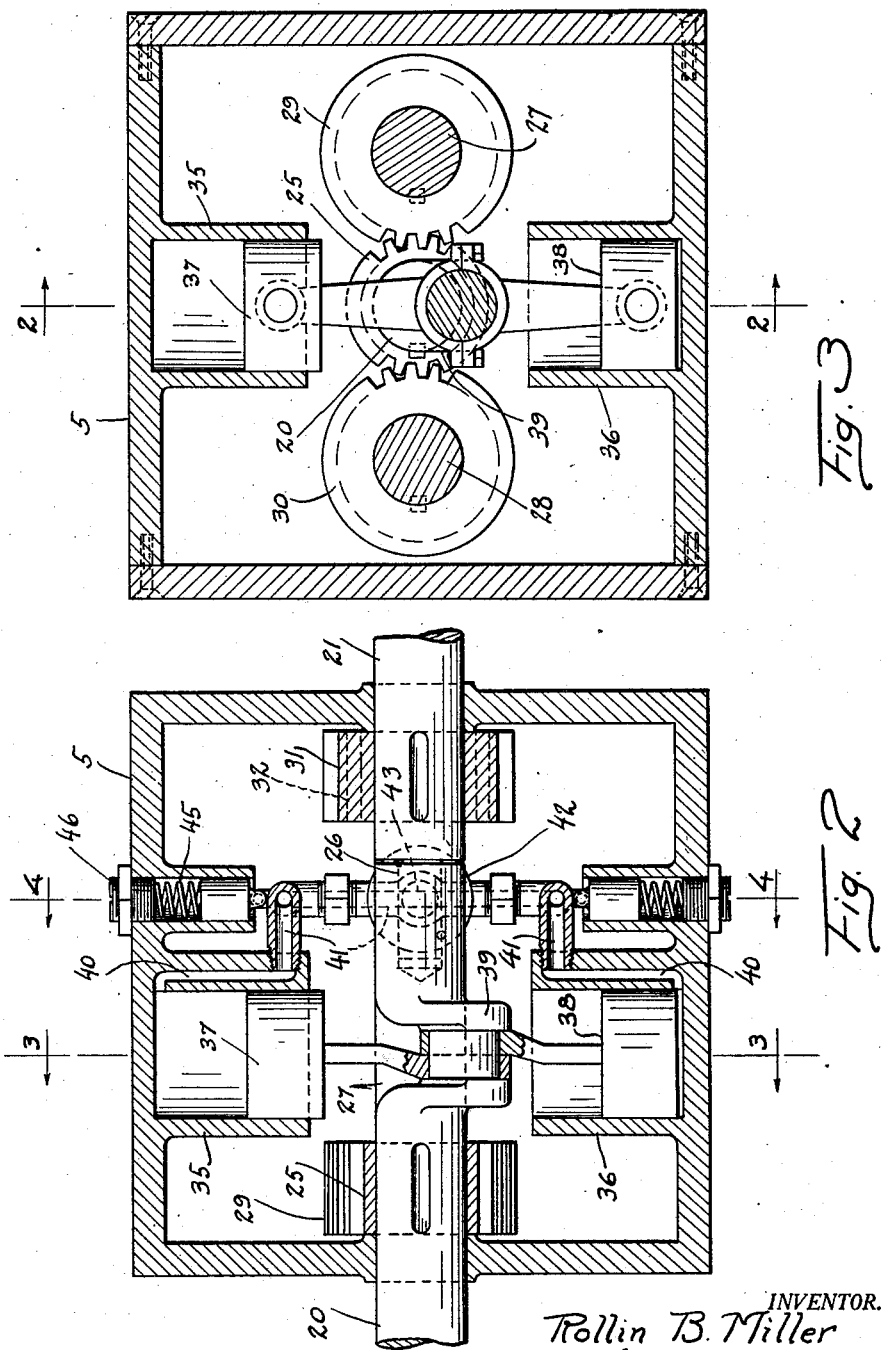
INVENTOR.
Rollin B. Miller
BY
Stuart C. Barnes
ATTORNEY.

Patented Dec. 8, 1931

1,835,318

UNITED STATES PATENT OFFICE

ROLLIN B. MILLER, OF DETROIT, MICHIGAN

VARIABLE SPEED POWER TRANSMITTING MECHANISM

Application filed November 29, 1929. Serial No. 410,430.

This invention relates to a power transmitting device capable of providing a variable gear ratio between the source of power and the driven or operated mechanism.

The invention is concerned principally with such a device adapted for use with an automotive vehicle. The invention is described herein in connection with an automotive vehicle, although it is obvious that the invention is not limited to such use, but is capable of use in power transmitting mechanism generally.

In accordance with the invention, a power transmitting mechanism is provided which will automatically operate to effect various gear ratios between driving and driven parts, without the necessity of shifting gears as is now almost the universal practice in automotive vehicles. It is advantageous in that the automatic control may be co-ordinated with the speed of the vehicle, and in this connection, a control mechanism acted upon by a centrifugal action determined by the vehicle's speed, is advantageously employed. The mechanism may be such as to constitute a permanent connection between the source of power and the driven mechanism, and in the case of an automotive vehicle, there is preferably associated with the variable drive mechanism, clutch and gears capable of manipulation to break the drive connection and to drive in the reverse direction.

In the accompanying drawings:

Fig. 2 is a setional view taken through the housing of the variable drive arrangement illustrating the driving and driven shafts and a liquid controlling means employed, this view being taken on line substantially 2—2 of Fig. 3.

Fig. 3 is a setional view taken substantially on line 3—3 of Fig. 2.

Figures 4, 5:
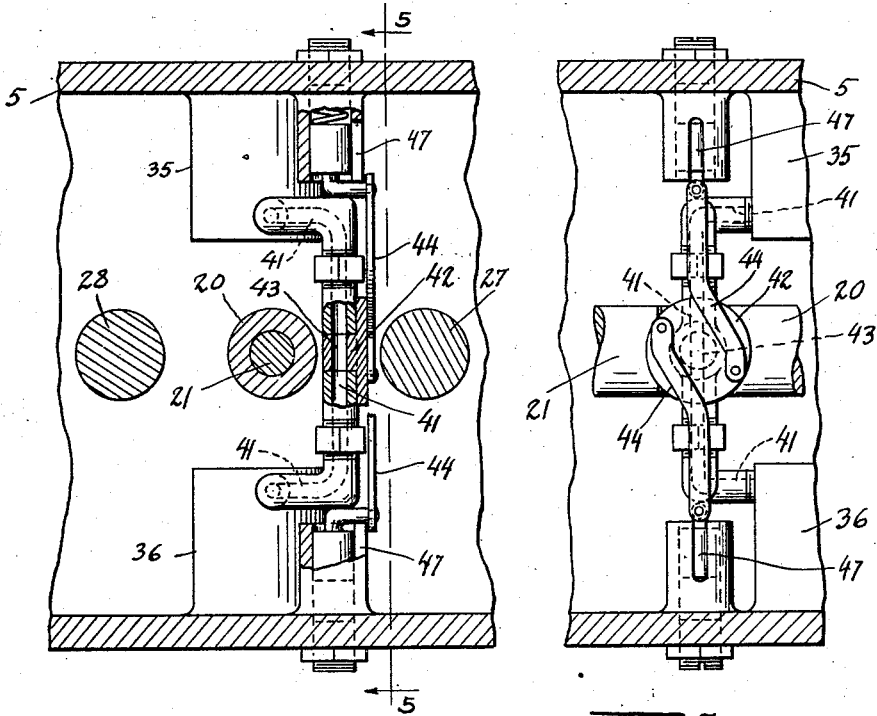
Fig. 4 is a setional view taken substantially on line 4—4 of Fig. 2 illustrating the fluid control means.
Fig. 5 is an interior view illustrating the centrifugal controlling elements and the valve controlled thereby.

The conventional engine of an automotive vehicle is illustrated at 1, provided with the usual clutch housing 2, there being a shaft 3, capable of disconnection from the engine by means of a clutch in a manner well understood by those versed in the art. The clutch may be operated as by means of a foot pedal 4.

The mechanism of the present invention centers around a revolvable casing or housing 5, together with the arrangement of operating parts therein. Before describing this mechanism, however, it will be noted that there is what may be termed a transmission housing 6 located preferably forward of the housing 5. Within this housing there is a shiftable element 7, shiftable by means of a rod 8 connected as shown, to rod 9, having a handle 10 adjacent the steering wheel 11. This element has a member 12 with dogs or teeth for engagement with a member 13 on the drive shaft 3. This constitutes a direct drive. Within the housing 6 is a countershaft 14 driven by means of gears 15 and 16 and having a gear 17, which, in association with an idler gear 18, drives the member 7 through a gear thereon as illustrated at 19. This constitutes a reverse drive. The details of this construction may be identical with the present transmission and need not be further described; suffice to say that the sliding gear 7 is capable of movement to establish a forward and reverse drive and neutral.

Figure 1:
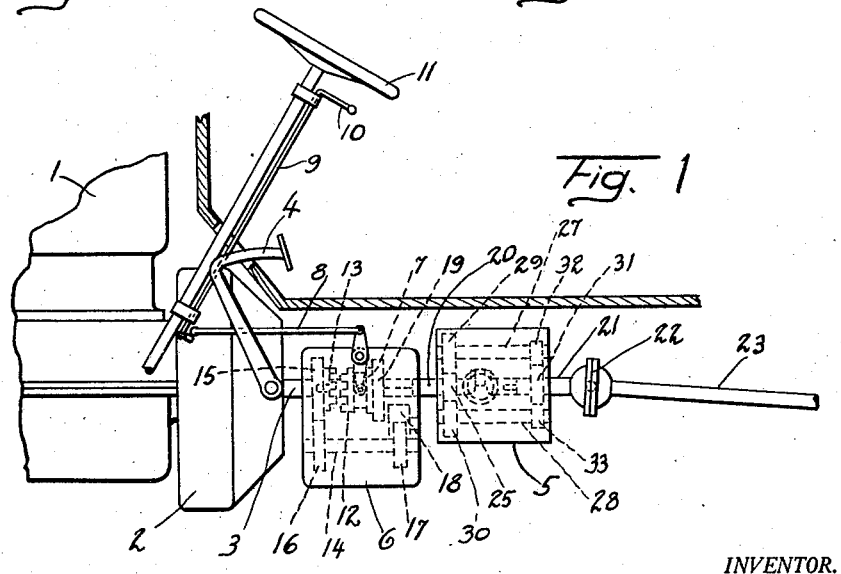
Fig. 1 is a general view illustrating a portion of an automotive vehicle showing the arrangement of the driving mehanism and illustrating in dotted lines, gears within the housing of such mechanism.

Extending from the housing 6 is a power shaft 20 and from the opposite side of the housing 5 is a shaft 21 connected through the means of the usual universal joint 22 to an automobile drive shaft 23 which extends to the wheels of the vehicle. The shafts 20 and 21 (Fig. 2) are separate and capable of independent rotation and for this purpose may be journaled together as illustrated at 26. Journaled in the housing 5 is a pair of countershafts 27 and 28 each having keyed thereto, pinions 29 and 30, which mesh with gear 25. Shaft 21 has a gear 31 keyed thereon and the countershafts have pinions similar to pinions 29 and 30 (Fig. 1) meshing with gear 31 (Fig. 1). These second named pinions are illustrated by the reference characters 32 and 33.

The construction thus far described includes all the elements which may be termed the gearing. It will be understood that the relative sizes of the gears and pinions may vary as desired in order that the normal ratio through the mechanism may vary as will be appreciated by the following description.

Assume that the housing 5 is stationary and that the shaft 20 starts to rotate: the pinion 25 starts to rotate and this in turn tends to revolve the countershafts 27 and 28 and these, through their pinions, tend to rotate shaft 21 and drive shaft 23. The normal ratio of rotation between shaft 20 and shaft 21 in this condition may advantageously be about 2¼ to 1. With the shaft 20 rotating assume that a resisting force prevents shaft 21 from rotating; gear 25 causes the countershafts 27 and 28 to rotate, but inasmuch as gear 31 is not rotating, the rotation of pinions 32 and 33 cause the housing 5 to bodily rotate backwardly with respect to shaft 20 as pinions 32 and 33 rotate around stationary gear 31. In this condition, no movement is transmitted to the drive shaft 23. Again, assume that the housing 5 is locked to the shaft 20 so that it must rotate therewith; there is now no rotation of the countershafts 27 and 28 on their own axes but the whole assembly within the housing rotates bodily so that the drive connection between shaft 20 and shaft 21 is direct or 1 to 1.

These are the three extreme conditions possible with the construction and the invention provides for an automatic controlling means for governing changes to and from these conditions. This controlling means comprises a pair of opposed cylinders 35 and 36, each having a piston 37 and 38 therein, with connecting rods joining them to a crank or eccentric portion 39 on the shaft 20. A suitable body of fluid, preferably in the form of a liquid and preferably a liquid not subject to great change in viscosity under temperature changes, such as glycerine, or certain grades of oil, is disposed in the cylinders. The cylinders are connected by passageways and conduits, as illustrated at 40 and 41, and situated in the passageway, so as to control the same, is a valve 42 provided with a port 43. The fluid also fills these passageways and conduits.

The valve is controlled by weights 47 connected to the valve by suitable links 44. These weights are mounted to reciprocate and are subject to centrifugal action. When the weights move outwardly under centrifugal action the movement is controlled as by means of springs 45 backed up by adjustable plugs or the like 46.

In the normal position of the parts, when the housing 5 is at rest, the valve 42 is open as shown in Fig. 4. However, upon rotation of the housing 5, the weights move outwardly under centrifugal action, the amount of movement depending on the speed of rotation, and the valve 42 is gradually closed until there is a sufficient movement of the weights governed by the speed of rotation to entirely close this valve. Assume that, in the operation of the vehicle, the shaft 20 starts revolving as the clutch is engaged; resistance of the drive shaft 23 tends to cause the housing 5 to rotate reversely to that of shaft 20. The relative rotation between the shaft 20 and the housing 5 effects reciprocation of the pistons 27 and 28, thus pumping the liquid back and forth from one to the other. This passage of liquid, even when the valve is entirely open, sets up resistance sufficient to start the rotating of shaft 21. In the event of a hard pull, the rotation of shaft 20 may be speeded up, thus accelerating housing 5 and the centrifugally controlled means partially closes valve 42, thus increasing the resistance.

Under more normal conditions, the housing may remain relatively stationary at the start with the liquid being pumped back and forth and the drive being communicated through the rotating countershafts and gearing; at this time the countershafts are turning and their pinions drive the gear on shaft 21. As the speed increases, the rotation of housing 5 increases and gradually the valve becomes closed. When it is entirely closed, the housing is locked to the shaft 20 so that there is no relative rotation between the two, with the result that shaft 20 and housing 5 and shaft 21 rotate in unison with a 1 to 1 drive. In the event the load becomes heavy, as for example, after the vehicle starts up an incline, the engine is decelerated in the natural manner, thus decelerating the rotation of housing 5 which permits the valve to open up somewhat whereupon the engine and shaft 20 may turn faster than the shaft 21.

Accordingly, it will be seen that the gear ratio automatically takes care of driving conditions, for the more the load increases, the slower the rotation of the housing with the resultant opening of the valves, which has the effect of reducing the gear ratio. It is thought that an advantageous construction is that of providing the housing 5 of a sealed nature so that it may be substantially or entirely filled with the fluid used in the control mechanism. This fluid will also serve as a lubricant for the gears but in normal operation there would be no turning of the gears as the whole assembly revolves. This power transmitting mechanism is incapable of effecting a reverse and, accordingly, the reverse gear in housing 6 is provided together with a neutral to break the driving connection in a manner understood by all automobile operators.

Claims:

1. A variable speed power transmitting device comprising in combination a drive shaft, a driven shaft, gears on these shafts, a rotatable housing, a countershaft in the housing having pinions meshing with the gears, cylinders carried by the housing, pistons therein, a crank on one of said shafts for reciprocating the pistons upon relative rotational movement between the shaft and housing, fluid means displaced by movement of the pistons in the cylinders, a valve for governing such displacement, and centrifugally controlled means acting upon the valve.

2. A variable speed transmitting device comprising in combination, a drive shaft, a driven shaft, a rotatable housing, gears on the shafts, countershafts in the housing having pinions meshing with the gears, cylinders carried by the housing, a conduit connecting the cylinders, pistons in the cylinders, a crank on one of the shafts operatively connected with the pistons for reciprocating them in their cylinders in opposite directions whereby to displace fluid back and forth through the conduit, a valve in the conduit, weights connected to the valve adapted to be thrown outward centrifugally for controlling the same, spring means for positioning the weight normally inwardly to hold the valve open.

3. A variable speed transmitting device comprising in combination, a drive shaft, a driven shaft, a rotatable housing, gears on the shafts, countershafts in the housing having pinions meshing with the gears, cylinders carried by the housing, a conduit connecting the cylinders, pistons in the cylinders, a crank on one of the shafts operatively connected with the pistons for reciprocating them in their cylinders in opposite directions whereby to displace fluid back and forth through the conduit, a valve in the conduit, weights connected to the valve adapted to be thrown outward centrifugally for controlling the same, spring means for positioning the weight normally inwardly to hold the valve open, and means for adjusting the tension of the springs.

In testimony whereof I affix my signature.

ROLLIN B. MILLER.